(12) United States Patent
Karpenko et al.

(10) Patent No.: US 10,309,469 B2
(45) Date of Patent: Jun. 4, 2019

(54) COULOMB FRICTION DAMPED COMPONENTS AND METHOD FOR MANUFACTURING SAME

(71) Applicant: Ford Global Technologies, LLC, Dearborn, MI (US)

(72) Inventors: Yuri A. Karpenko, Brighton, MI (US); David Allen, Grosse Ile, MI (US); James Maurice Boileau, Novi, MI (US); J. Chris Oakwood, West Bloomfield, MI (US); Peter Kowalow, Windsor (CA); Laura Dammeyer, Novi, MI (US); Steven Swisher, Ann Arbor, MI (US); Robert Gordon Rentschler, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 15/485,332

(22) Filed: Apr. 12, 2017

(65) Prior Publication Data
US 2018/0298964 A1    Oct. 18, 2018

(51) Int. Cl.
| | |
|---|---|
| *F16D 65/12* | (2006.01) |
| *F16D 65/00* | (2006.01) |
| *F16F 7/02* | (2006.01) |
| *F16D 65/02* | (2006.01) |

(52) U.S. Cl.
CPC ..... *F16D 65/0012* (2013.01); *F16D 65/0006* (2013.01); *F16D 65/125* (2013.01); *F16F 7/02* (2013.01); *F16D 2065/132* (2013.01); *F16D 2065/1328* (2013.01); *F16D 2200/0013* (2013.01); *F16D 2250/0015* (2013.01)

(58) Field of Classification Search
CPC ......... F16D 65/0006; F16D 2200/0013; F16D 2250/0015
See application file for complete search history.

(56) References Cited

U.S. PATENT DOCUMENTS

| | | | |
|---|---|---|---|
| 6,465,110 | B1 | 10/2002 | Boss et al. |
| 8,758,902 | B2 | 6/2014 | Hanna et al. |
| 8,904,642 | B2 | 12/2014 | Hanna et al. |
| 2009/0032674 | A1* | 2/2009 | Hanna ................ F16D 65/0006 248/562 |

(Continued)

FOREIGN PATENT DOCUMENTS

DE    2446938 A1    4/1976

Primary Examiner — Nicholas J Lane
(74) Attorney, Agent, or Firm — LeClairRyan

(57) ABSTRACT

A friction damping cast component and method of production are disclosed. The components may be rotary, such as a cast brake rotor, or may be non-rotary, such as a cast suspension part or a cast engine block. Regardless of the type of component, a two-part vibration-damping insert having a thin metal core and a thin metal sheath is provided. The sheath fully encompasses the core in such a way that a dry sliding friction contact develops at their interfaces. The outer surface of the sheath with the metal core inside is rigidly bonded to the cast material that surrounds it during the casting process. The sheath surfaces may have a number of openings that allow a limited infiltration of molten cast iron material just inside the immediate vicinity of the sheath openings for spot rigid bonding between the surrounding cast material and the insert surfaces during casting.

15 Claims, 15 Drawing Sheets

(56) References Cited

U.S. PATENT DOCUMENTS

| | | | |
|---|---|---|---|
| 2009/0260931 A1 | 10/2009 | Ulicny et al. | |
| 2009/0260939 A1* | 10/2009 | Golden | B22D 19/00 188/381 |
| 2013/0256143 A1* | 10/2013 | Schroth | B22D 19/00 205/172 |
| 2016/0341269 A1* | 11/2016 | Karpenko | B22D 19/04 |
| 2018/0073588 A1* | 3/2018 | Boileau | F16F 7/00 |

* cited by examiner

US 10,309,469 B2

COULOMB FRICTION DAMPED COMPONENTS AND METHOD FOR MANUFACTURING SAME

TECHNICAL FIELD

The disclosed inventive concept relates to friction damped components for a vehicle. More particularly, the disclosed inventive concept relates to a coulomb friction-damped components and methods for manufacturing such components. The components may be rotary, such as a cast brake rotor, or may be non-rotary, such as in the case of a cast suspension part or a cast engine block. Regardless of the type of coulomb friction damped component, a two-part insert is embedded in the component. The two-part insert includes a thin core of metal and a thin metal sheath that encompasses the core of metal. Alternatively, the core may be an array of ring segments in which each segment has a thin metal sheath formed thereover. A dry sliding friction contact is developed at the interface of the core of metal and the encompassing sheath when the component is subject to vibration. The two-part insert is cast in the component during manufacturing.

BACKGROUND OF THE INVENTION

The modern automotive vehicle utilizes several cast components that are subject to vibration during vehicle operation. Some of these components, such as the brake rotor, are subject to vibration during braking. Others, such as suspension parts, are subject to vibration during vehicle movement. Still others, such as the vehicle engine block, are subject to vibration at any time the vehicle engine is on.

The disc brake system is particularly subject to vibration and the resulting undesirable noise, vibration and harshness. The conventional disc brake system of today's vehicle incorporates a hydraulically-operated disc brake assembly that includes a brake caliper fixed to the vehicle and a disc brake rotor. The brake caliper includes a pair of opposed brake pads of which one is driven by a piston. The brake disc includes a disc and a central hub. Upon braking, the disc of the disc brake rotor is captured between the opposed brake pads.

The disc brake rotors are key components of a braking system. The rotors are load-carrying elements as they represent half of the disc/pad friction pair. The disc brake rotor is also a very efficient radiator of sound due to its large surface area. Braking action takes place between the rotors and brake pads pushed against the rotor under hydraulic pressure. Under light pressures often used by customers to control vehicle speed, brake pads can make only a partial contact with rotor surfaces leading to unstable friction between the brake pads and the rotor. Unstable behavior of the disc/pad friction pair can cause a resonant vibration in the brake disc. Since grey cast iron material typically used for brake discs has relatively low damping capacity, the disc resonant vibration amplitude might built up to produce objectionable squeal noise. This noise is a significant, recurring, and stubborn source of customer complaints to vehicle manufacturers. The volume and expense of remediation efforts encourage vehicle engineers to seek further improvements on brake systems.

Thus, an increase in the disc brake rotor damping capacity is highly desired to suppress the disc resonant vibration and to prevent squeal noise occurrence. Numerous prior studies have shown that an introduction of coulomb friction damping into a brake disc can help attenuate its resonant vibration and mute the squeal noise. (See, e.g., A. Akay, *Acoustics of Friction*, J. Acoust. Soc. Am., Vol. 111, No. 4, pp. 1539-1540, April 2002.) Such studies have also shown that contacts that generate friction damping generally fall into two groups: 1) contact between nominally conforming surfaces that do not have a relative rigid-body motion between the surfaces (as in the case of wire cables, e.g., U.S. Patent Pub. No. 20160097433 A1), and 2) contacting surfaces that also have a relative whole-body motion as in the case of solid inserts in brake rotors, e.g. (U.S. Pat. No 7,975,750 B2).

Unfortunately, none of the friction damper proposals using embedded solid inserts have yet been implemented for mass production because of concerns related to the structural integrity of the modified brake rotors. The primary challenge of these proposals includes the need for the insert surfaces to have both an ability of sliding inside the disc plate for friction damping and a proper bonding to the base rotor material to ensure the structural integrity of the rotor. In reality, it is very difficult to always satisfy such contradictory requirements for the same friction interface. For example, U.S. Patent Pub. No. 20130256143 A1, U.S. Pat. No. 8,118,079 B2, and U.S. Pat. No. 8,245,758 B2 proposed pre-treating the insert surfaces to avoid complete bonding with rotor surfaces during casting. However, such pre-treatment can lead to insufficient bonding between the insert and rotor surfaces, which may impact brake rotor structural integrity, representing a safety concern.

To address safety concerns, U.S. Patent Pub. No. 20160097433 A1 proposes the embedding of wire cables into brake components as friction damper inserts where the outer surface of the cable is used for bonding between the cable and the rotor materials while the wires inside are free to slide with respect to each other and thereby provide friction damping.

Other cast components, such as suspension components and the engine block as mentioned above, are subject to vibration during operation. Many of the same problems attributed to the disc rotor arise in these components during vehicle operation. Similar efforts have been undertaken to address these problems as have been undertaken in dealing with vibration in the brake rotor.

However, despite these improvements in the state of the art, there yet remains room in the technology of cast vehicle components for improvements that yield a reduction in noise, vibration and harshness without compromising structural integrity.

SUMMARY OF THE INVENTION

The disclosed inventive concept provides a method and system for friction damping in a cast component for a vehicle. The components may be rotary, such as a cast brake rotor, or may be non-rotary, such as in the case of a cast suspension part or a cast engine block. Regardless of the type of component, a two-part vibration-damping insert having a thin metal core and a thin metal sheath is provided and is formed around the core. The sheath fully encompasses the core in such a way that a dry sliding friction contact develops at their interfaces. The outer surface of the sheath (with the metal core inside) is rigidly bonded to the cast material that surrounds it during the casting process.

In the case of a cast brake rotor, the disclosed inventive concept reduces disc brake rotor squeal on braking through increased damping capacity without compromising the structural integrity of the rotor as well as a method for manufacturing such a rotor. The present invention provides an increase in the disc brake rotor damping capacity by embedding the two-part insert into the brake rotor plate during the casting stage. The two-part insert may be a single ring-shaped core having sheath formed thereover or may be an array of ring segments in which each segment has a thin metal sheath formed thereover.

An increase in the damping capacity of the resulting disc brake rotor is realized due to coulomb friction developed at the contact interfaces of the metal sheath and the thin core of metal inside it. Simultaneously, rigid bonding between the corresponding brake rotor and sheath surfaces ensures the structural integrity of the dry friction damped rotor. The two-part insert configuration may be tunable by having a specific pattern that increases damping capacity primarily in the rotor areas that have the highest vibration amplitudes during brake disc resonances.

According to another feature of this invention, the sheath surfaces may have a number of relatively small openings with an axisymmetric spatial distribution. Their purpose is to allow a limited infiltration of molten cast iron material just inside the immediate vicinity of the sheath openings for spot rigid bonding between the brake rotor and the insert surfaces during rotor casting. The limited spot rigid bonding between the insert and rotor materials helps to avoid the possible reduction in the overall contact pressure at the sliding interface between the sheath and the insert surfaces due to their unavoidable thermal distortion arising during the rotor casting process.

This arrangement also helps to prevent undesirable differences in the spatial distribution of the brake rotor and core insert temperatures during the brake service life insofar as differences in the brake rotor and the insert temperatures might produce a thermal distortion of the insert within the sheath. This thermal distortion could negatively impact sliding contact conditions, mainly in the form of contact pressure, between the sheath and metal insert surfaces.

In the case of non-rotary cast components such as suspension parts or engine blocks, a similar two-part insert is used. The insert for this application may be block-shaped and may have more than one core formed within a single sheathing body. Suspension components may include, for example, control arms.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
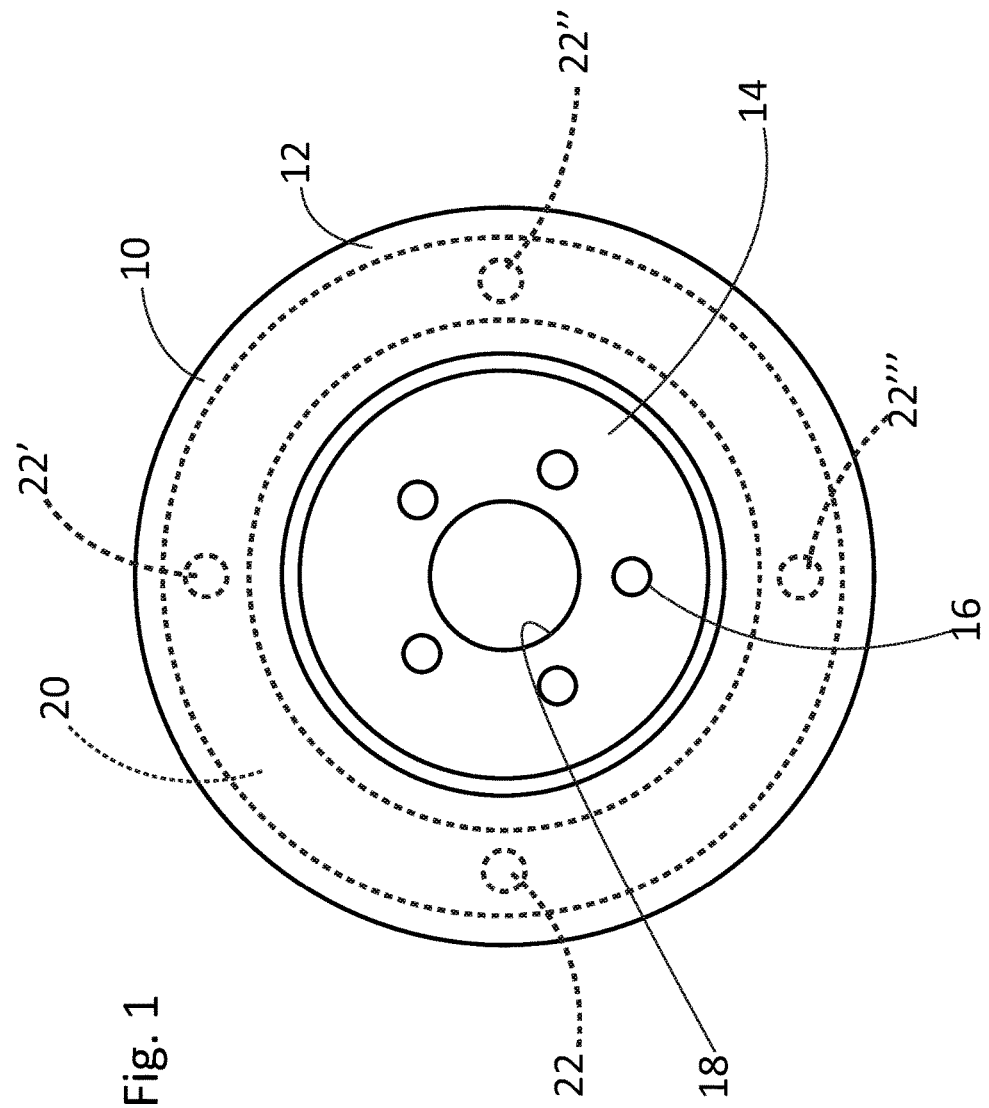
FIG. 1 is a front view of a disc brake rotor having an embedded two-part insert for dampening friction according to one embodiment of the disclosed inventive concept.

In the following figures, the same reference numerals will be used to refer to the same components. In the following description, various operating parameters and components are described for different constructed embodiments. These specific parameters and components are included as examples and are not meant to be limiting.

Friction damping has a preferred range of contact force (contact pressure) within which it becomes most effective. Below such an optimum range, excess relative motion at the interface develops without significant energy dissipation. Above it, excess contact pressure limits the development of relative motion for friction to act as an effective damper.

Contact pressure between two surfaces depends on their contact geometry and elastic properties which are known to change with surface temperature and temperature gradients. The operating temperature range for brake rotors is very wide, ranging from approximately −40° C. (after overnight soaks outside in cold climate areas during winter time) up to approximately 500° C. (during an emergency stop from high speed or during a continuous use of brakes while driving in a mountainous area). Since unwanted brake noise might occur during any temperature condition, the change in the friction damper effectiveness with brake temperature should be minimized. The disclosed inventive concept achieves that by minimizing variation between the temperature fields and their gradients inside the brake rotor and the metal ring insert as described hereafter.

The accompanying figures and the associated description illustrate the construction of and method of making a coulomb friction damped brake component having an internal two-part ring for increasing damping capacity of the component which is illustrated as a disc brake rotor, according to the disclosed inventive concept. However, while a disc brake rotor is illustrated and described, it is to be understood that the two-part insert may find suitable application in virtually any cast part. Accordingly, the illustrated and discussed use of the two-part insert in a disc brake rotor is suggestive and is not intended as being limiting. In addition, while it is shown in the figures that a single two-part insert is positioned within the component, a greater number of inserts may be positioned coaxially depending on a variety of factors, including the size of the cast component and the degree of vibration to be dampened.

Figure 2:
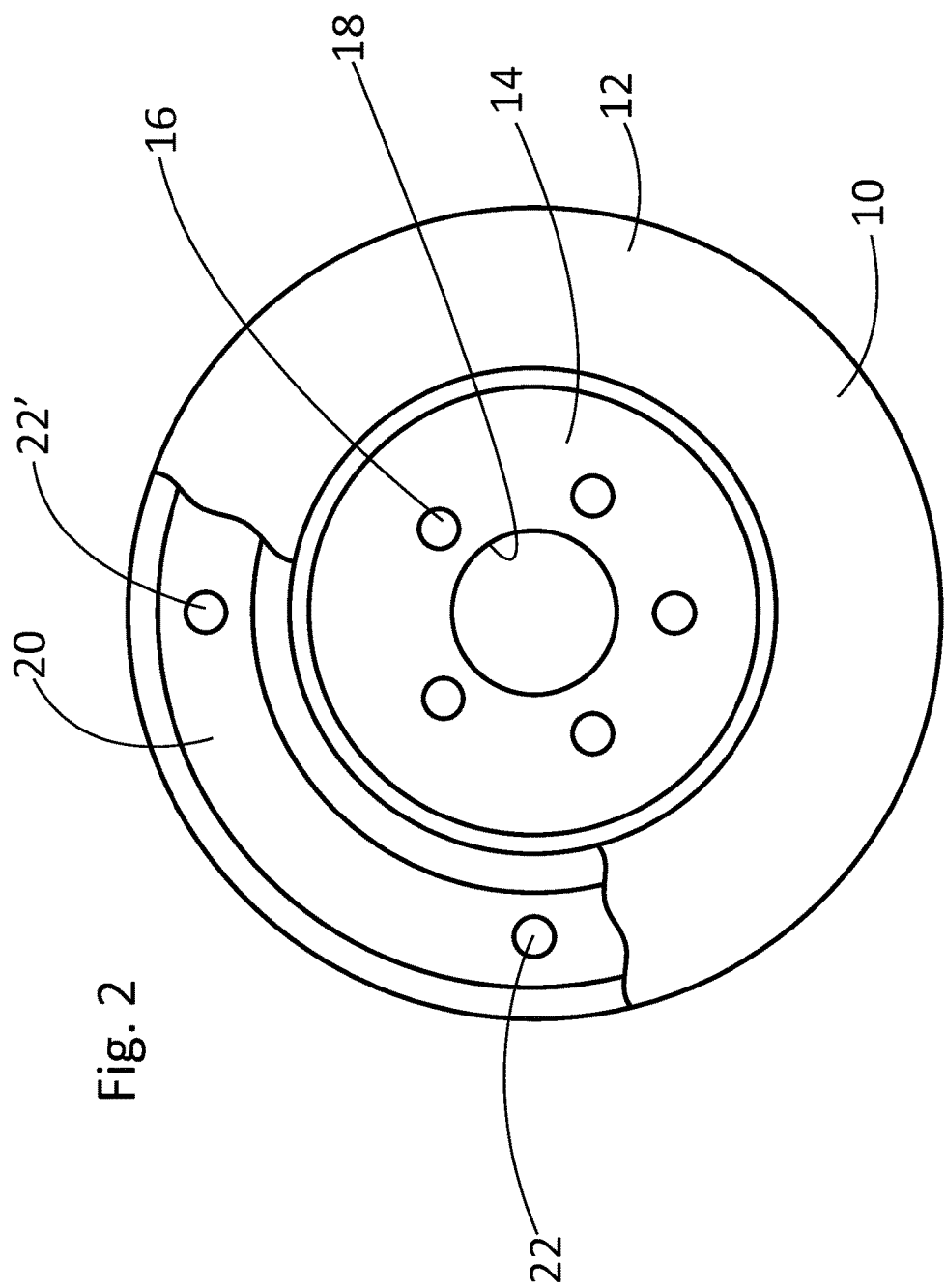
FIG. 2 is a view of the disc brake rotor of the disclosed inventive concept that is similar to the view of FIG. 1 but showing a portion of the disc portion broken away to disclose the two-part insert.

Referring to FIGS. 1 and 2, two front views of a disc brake rotor having an embedded two-part insert for dampening friction according to the disclosed inventive concept are illustrated, generally as 10. FIG. 1 is a front view of the dry friction damped rotor 10 having an insert for dampening friction while FIG. 2 is generally the same view as that of FIG. 1 but instead illustrates the dry friction damped rotor 10 with a portion broken away to disclose the insert.

It is to be understood that the general shape and dimensions of the dry friction damped rotor 10 illustrated in the accompanying figures are intended as being suggestive and not limiting. Referring to both FIG. 1 and FIG. 2, the dry friction damped rotor 10 includes a disc portion 12 and an integrally formed hub portion 14. A plurality of wheel stud apertures 16 is formed in the hub portion 14. A greater or lesser number of wheel stud apertures 16 may be formed in the hub portion 14. A stub axle/bearing aperture 18 is centrally formed in the hub portion 14.

A two-part ring insert 20 for coulomb friction damping is integrally formed with the dry friction damped rotor 10. Prior to casting, the two-part ring insert 20 is positioned within a rotor mold by conventional positioning means, such as by the use of positioning tabs (not shown). The two-part ring insert 20 optionally includes a plurality of sheath openings 22, 22', 22" and 22'" the positioning of which defines axisymmetric spatial distribution around the center of the stub axle/bearing aperture 18. While four sheath openings are illustrated, it is to be understood that a greater or lesser number of openings may be formed in the sheath.

Figure 3:
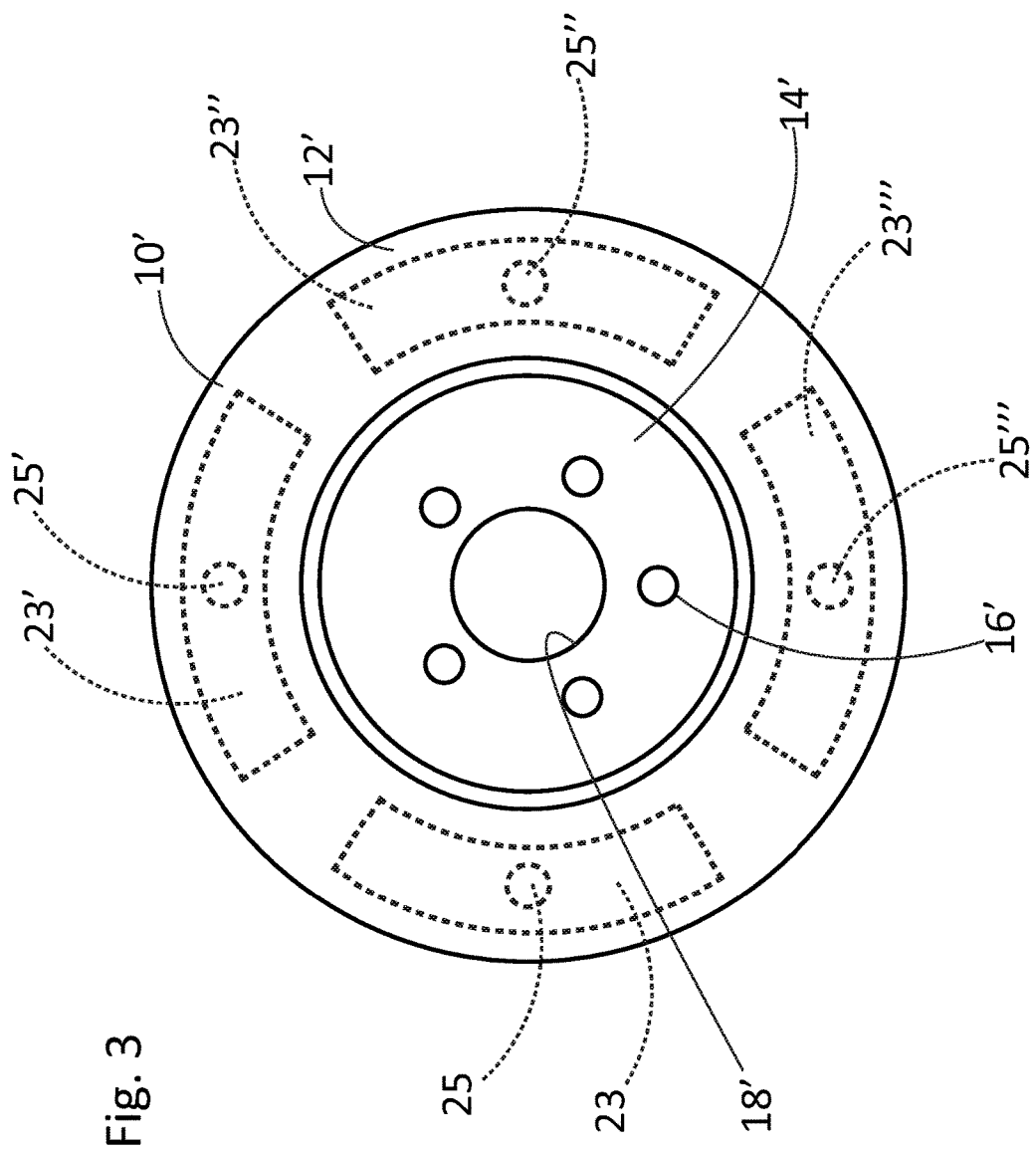
FIG. 3 is a front view of a disc brake rotor having an embedded two-part insert for dampening friction according to another embodiment of the disclosed inventive concept.

An alternate embodiment of the disc brake rotor of FIGS. 1 and 2 is illustrated in FIG. 3 in which a dry friction damped rotor 10' is illustrated. The dry friction damped rotor 10' includes a disc portion 12' and an integrally formed hub portion 14'. A plurality of wheel stud apertures 16' is formed in the hub portion 14'. A greater or lesser number of wheel stud apertures 16' may be formed in the hub portion 14'. A stub axle/bearing aperture 18' is centrally formed in the hub portion 14'.

A multi-segment insert comprising ring segments 23, 23', 23" and 23'" for coulomb friction damping is integrally formed with the dry friction damped rotor 10'. Prior to casting, the ring segments 23, 23', 23" and 23'" are positioned within a rotor mold by conventional positioning means, such as by the use of positioning tabs (not shown). Each of the ring segments 23, 23', 23" and 23'" optionally includes a sheath opening. Accordingly, the ring segment 23 optionally includes a sheath opening 25, the ring segment 23' optionally includes a sheath opening 25', the ring segment 23" optionally includes a sheath opening 25", and the ring segment 23'" optionally includes a sheath opening 25'". While four ring segments are illustrated, it is to be understood that a greater or lesser number of ring segments may be included.

Figure 4:
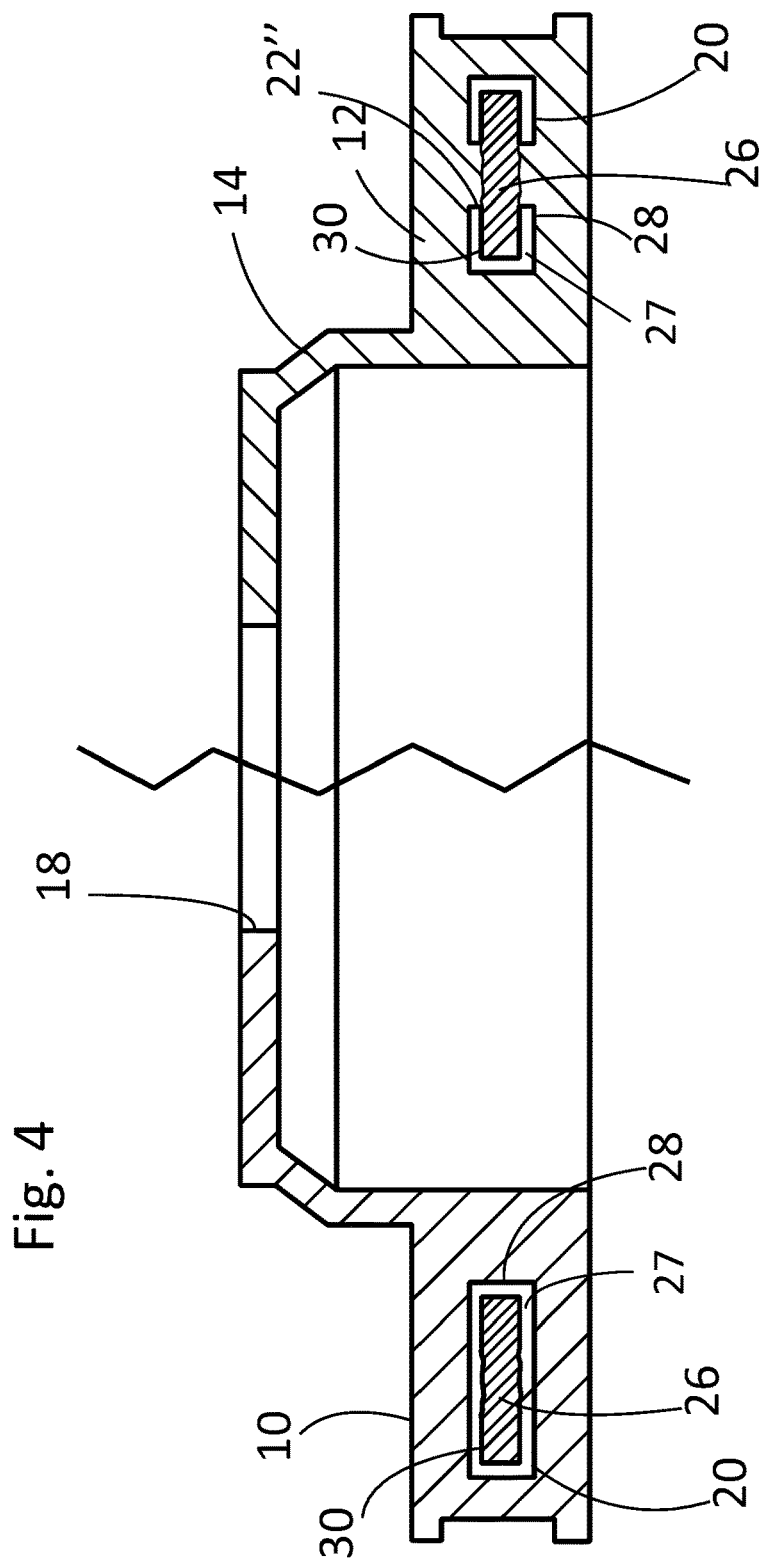
FIG. 4 is a sectional view of the disc brake rotor of the disclosed inventive concept illustrating two embodiments side-by-side.

A sectional, side-by-side view of two embodiments of the dry friction damped rotor 10 is illustrated in FIG. 4. The two-part ring insert 20 includes a thin metal core 26 and a surrounding metal sheath 27. Both the thin metal core 26 and the surrounding metal sheath 27 may be formed from any one of a variety of metals.

Upon casting of the dry friction damped rotor 10, the inflowing molten iron surrounds and envelopes two-part ring insert 20 whereby the cast metal and the metal sheath 27 are rigidly and fixedly bound at an interface 28 formed between the metal sheath 27 and the adjacent cast molten cast iron. Thus the metal sheath 27 is immovable relative to the surrounding cast material at the interface 28.

An interface 30 is also formed between the thin metal core 26 and the surrounding metal sheath 27 of the dry friction damped rotor 10. Unlike the interface 28 formed between the metal sheath 27 and the adjacent cast metal, a dry sliding friction contact occurs between the thin metal core 26 and the surrounding metal sheath 27 when the dry friction damped rotor 10 is in use. It is by this construction that the increase in the damping capacity of the dry friction damped rotor 10 is realized due to coulomb friction developed at the interface 30. At the same time the rigid bond formed at the interface 28 between the metal sheath 27 and the surrounding metal ensures the structural integrity of the dry friction damped rotor 10.

Figure 5:
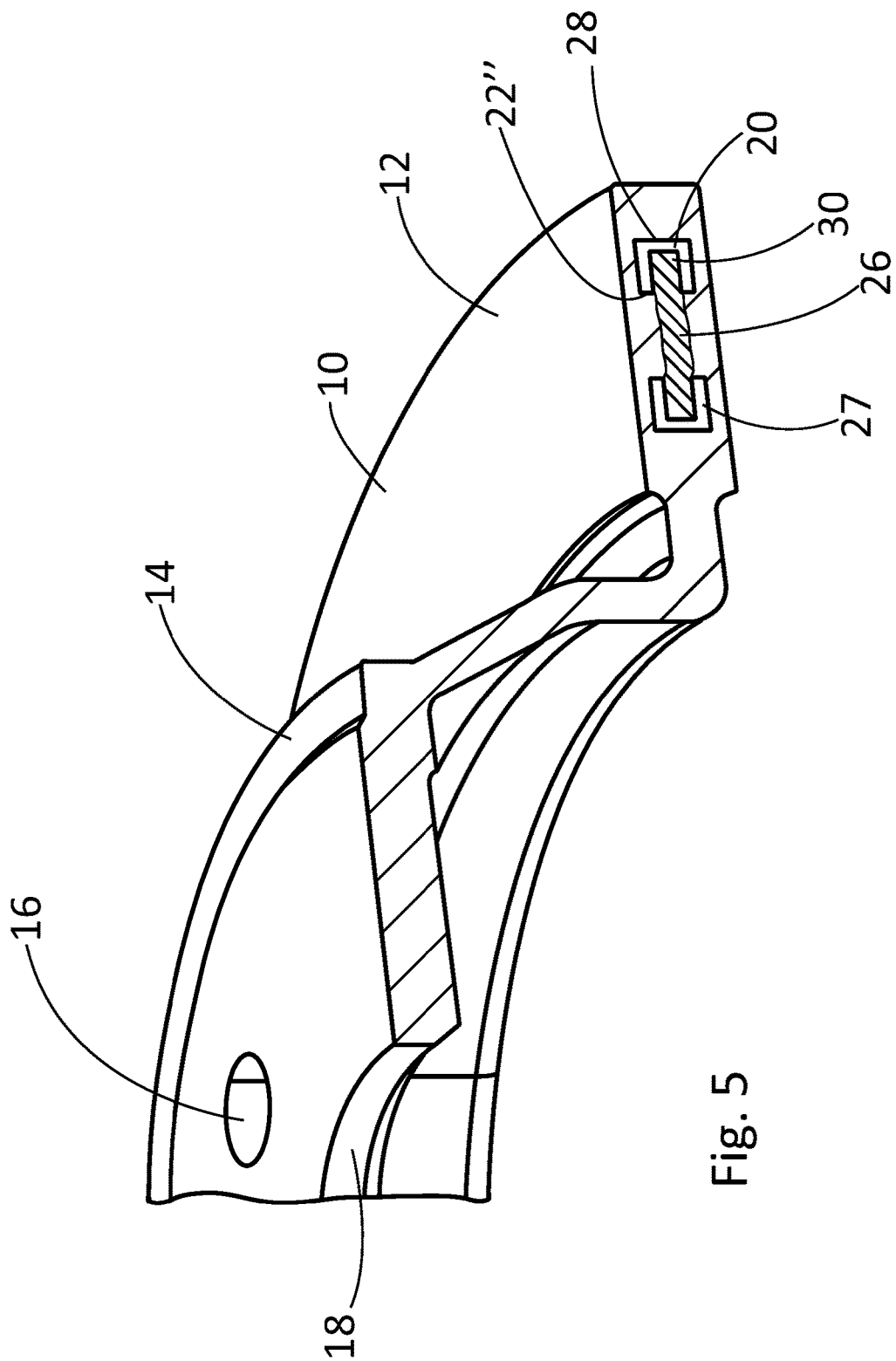
FIG. 5 is a sectional perspective view of the disc brake portion of the rotor of the disclosed inventive concept.
Figure 6:
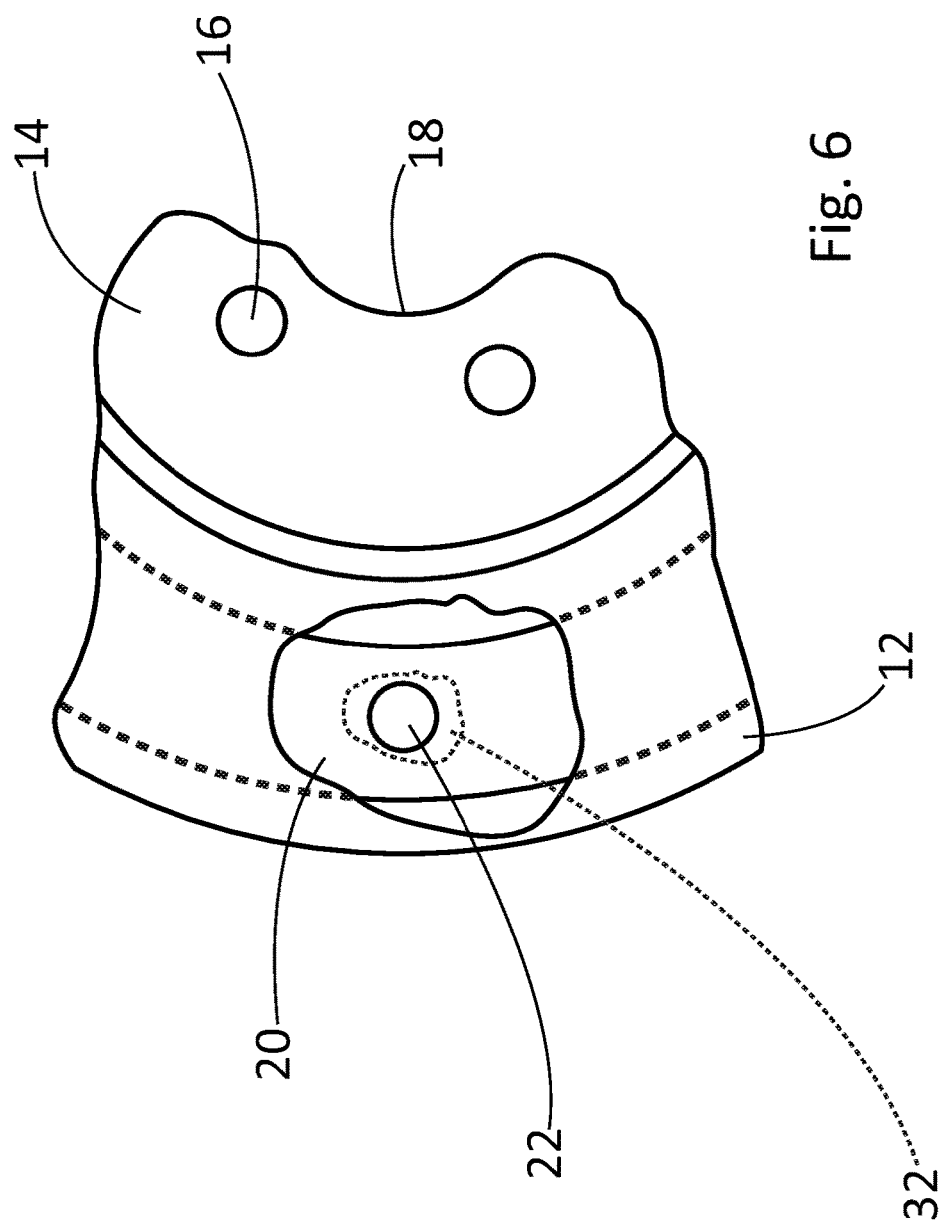
FIG. 6 is a view of a portion of the disc brake rotor of the disclosed inventive concept in which an aperture formed in the thin metal sheath is illustrated together with an image of the in-flowed cast material formed near the aperture.

The above-discussed axisymmetric sheath openings 22, 22', 22" and 22'" are optionally but preferably formed in strategic locations through both sides of the metal sheath 27 as illustrated in the right portion of FIG. 4 and in FIG. 5 in which the sheath opening 22" is optionally provided. The sheath openings 22, 22', 22" and 22'" each allow a limited infiltration of molten cast iron material 32 just inside the immediate vicinity of the sheath openings as illustrated in FIG. 6 in which a portion of the rotor 10 is illustrated. The infiltrated molten iron material 32 provides spot rigid bonding between the brake rotor and the surfaces of the two-part ring insert 20 during rotor casting. The limited spot rigid bonding between the two-part ring insert 20 and rotor materials helps avoid possible reduction in the overall contact pressure at the sliding interface at the interface 30 between the metal sheath 27 and the surrounding cast iron due to unavoidable thermal distortion arising during the rotor casting process.

Figure 7:
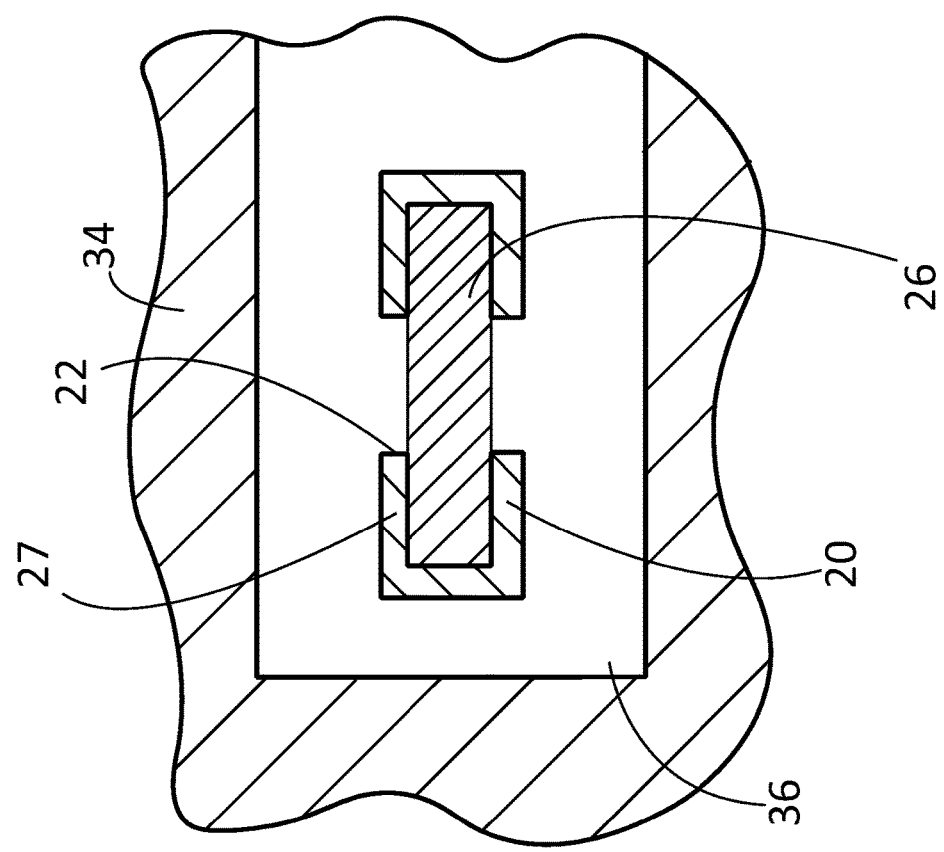
FIG. 7 is view of a portion of a mold cavity with the sheathed core of the disclosed inventive concept positioned therein.
Figure 8:
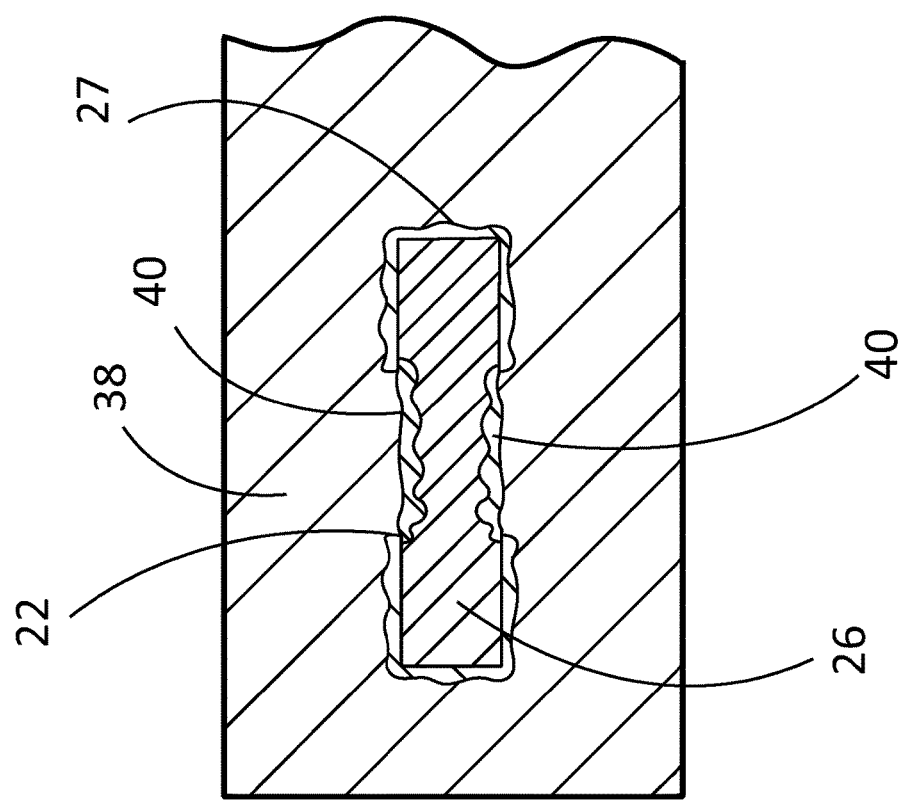
FIG. 8 is view of a portion of a cast disc brake rotor having the sheathed core of the disclosed inventive concept embedded therein following the inflow of molten metal.

A method of producing the disc brake rotor having embedded therein the two-part insert is illustrated in FIGS. 7 and 8. Referring to FIG. 7, a mold 34 having a mold cavity 36 formed therein is illustrated. The two-part ring insert 20 is centrally positioned within the mold cavity 36 and is held in place by a plurality of spacers (not illustrated) as provided for in the art of casting. The two-part ring insert 20 includes the metal core 26 surrounded by the metal sheath 27. The sheath opening 22 is formed in the metal sheath 27.

When the casting material 38 is introduced into the mold cavity 36 for formation of the cast component as illustrated in FIG. 8 in which the mold 34 has been removed, some of the casting material 38 passes through the sheath opening 22 and into the metal core 26 thereby creating an infused area 40. It is this cast bridge formed between the infused area 40 and the surrounding casting material 38 that provides strategic but limited connection regions between the two-part ring insert 20 and the casting material 38. Because of its high heat, the casting material 38 also partially degrades the outer layer of the sheath 27 as illustrated. Such material degradation falls short of degrading the core 26 itself.

As noted above, it is to be understood that the arrangement of the disclosed inventive concept for damping components may be used in a variety of applications that go beyond the rotary component discussed above in relation to FIGS. 1 through 8. Two non-limiting embodiments are illustrated in FIGS. 9 through 13 and FIGS. 14 through 16.

Figure 9:
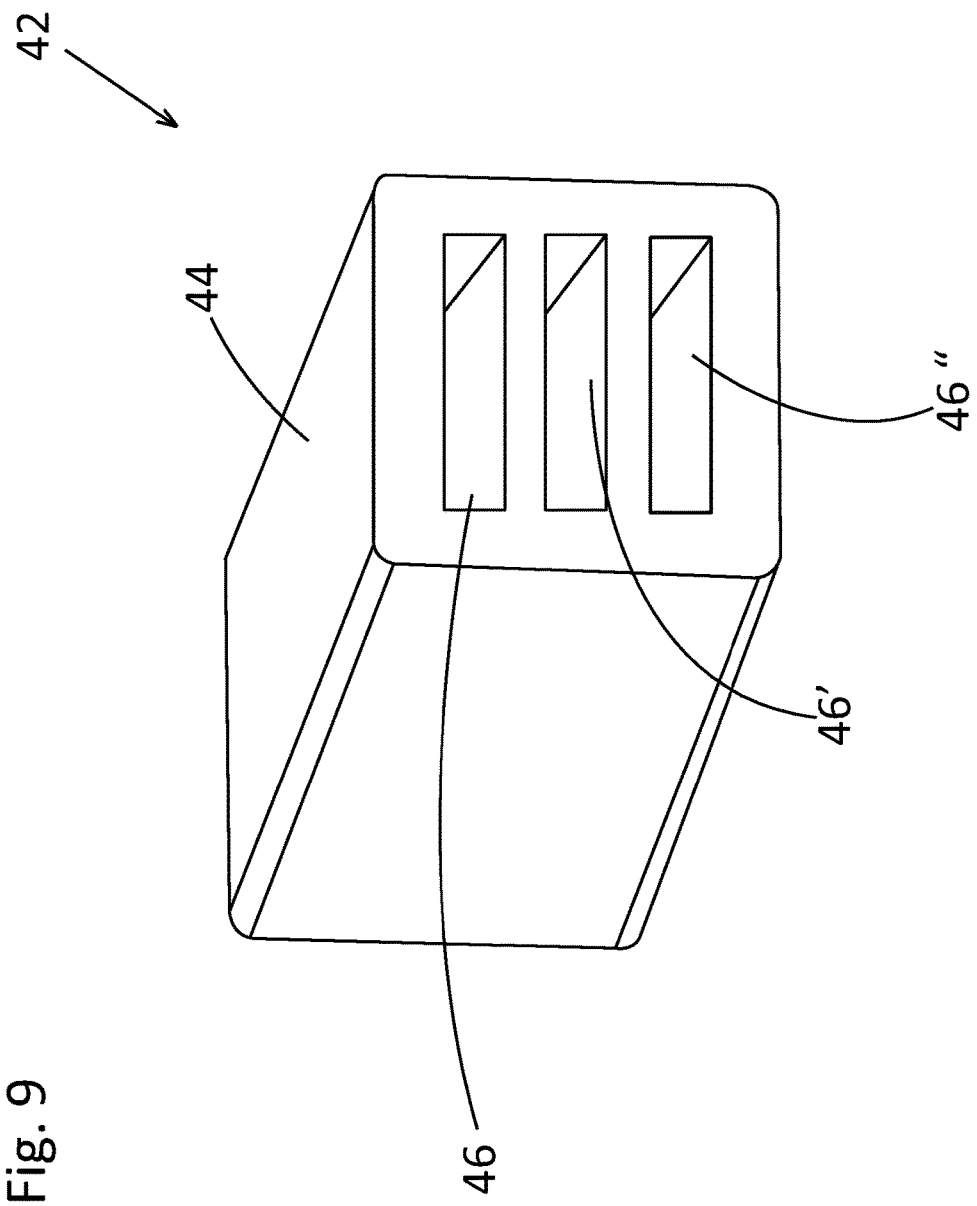
FIG. 9 is a perspective view of a vibration dampener according to another embodiment of the disclosed inventive concept.
Figure 10:
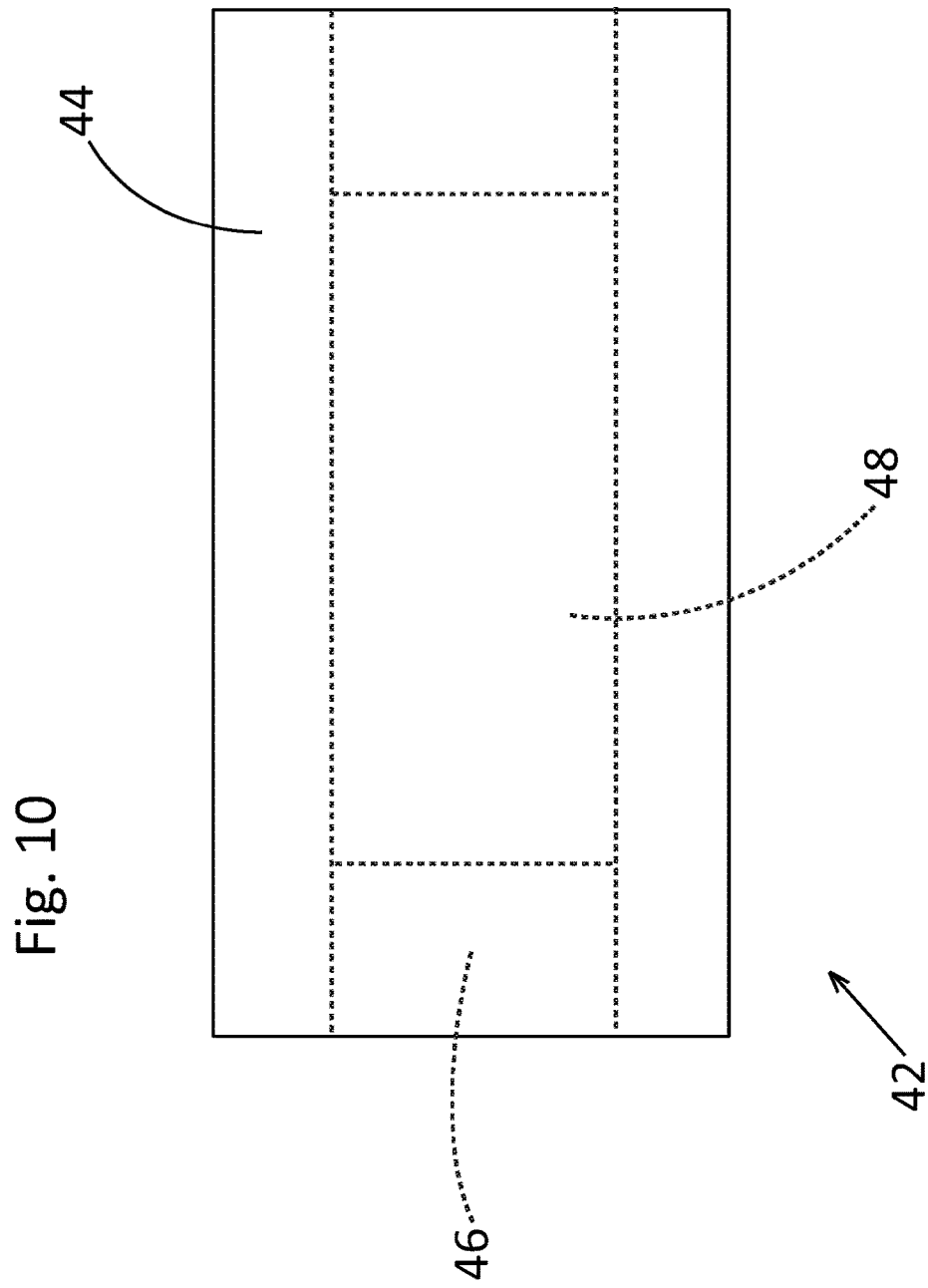
FIG. 10 is a top plan view of the vibration dampener of FIG. 9.

Referring to FIGS. 9 and 10, an alternative cast-in two-piece vibration damper 42 is illustrated in perspective view. The vibration damper 42 includes an outer sheath 44 and a plurality of openings such as openings or slots 46, 46' and 46". A greater or lesser number of slots 46, 46' and 46" may be provided. Within each slot, and as illustrated in FIG. 10, a core 48 is formed. The size and position of the core 48 within the slot 46 as shown in FIG. 10 is only suggestive as other sizes and locations may be possible. The openings or slots 46, 46' and 46" serve the same function as the openings 22, 22', 22" and 22'" shown, for example, in FIGS. 1 and 2 and openings 25, 25', 25" and 25'" shown in FIG. 3.

Figure 11:
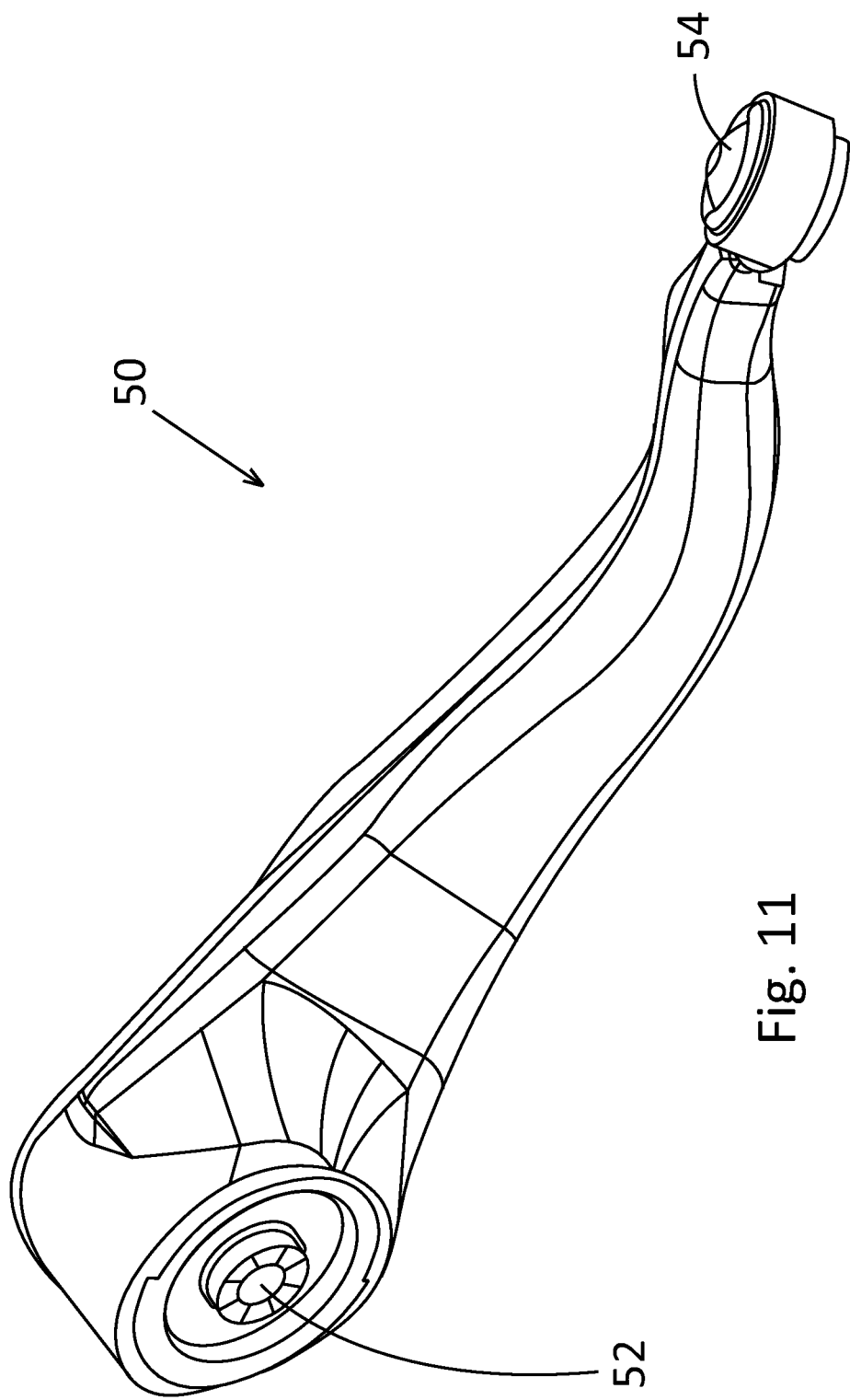
FIG. 11 is perspective view of a cast lower control arm in which the vibration dampener of FIG. 9 has been embedded.
Figure 13:
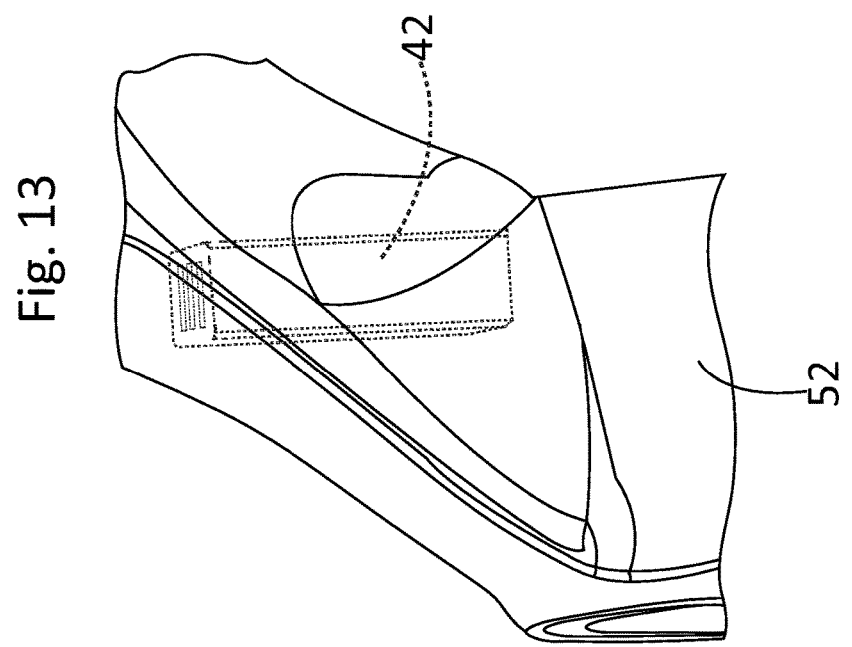
FIG. 13 is another view of the portion of the lower control arm of FIG. 11 illustrating the vibration dampener of FIG. 9 embedded therein.
Figure 12:
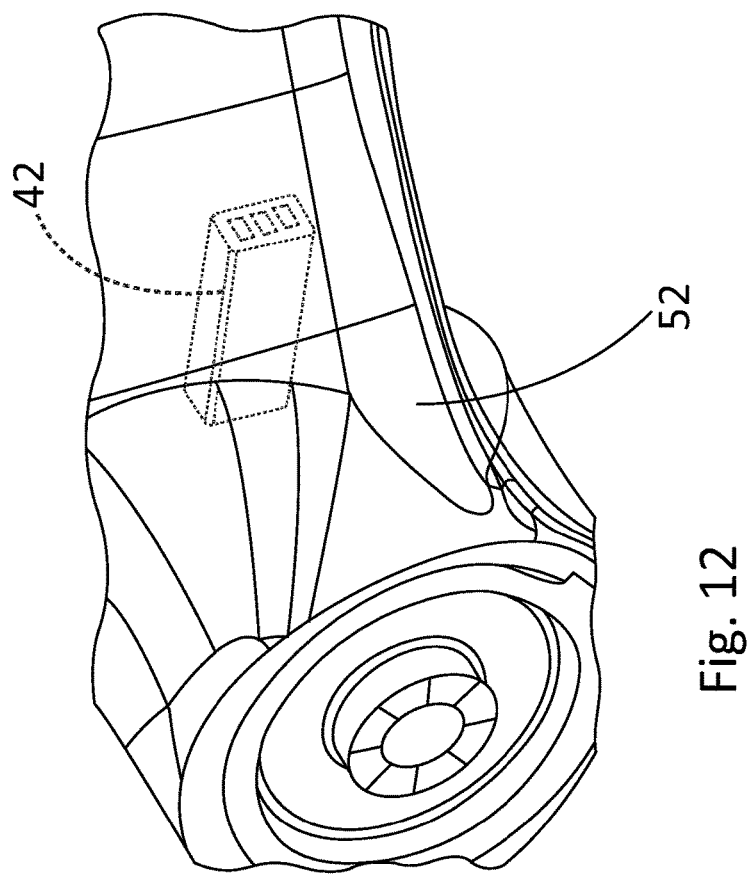
FIG. 12 is view of a portion of the lower control arm of FIG. 11 illustrating the vibration dampener of FIG. 9 embedded therein.

The vibration damper 42 may be adapted for use in any of a number of cast components such as those finding application in the suspension of an automotive vehicle. As a non-limiting example, and as illustrated in FIG. 11, the vibration damper 42 may be positioned within a component such as a control arm 50. The control arm 50 includes a first connecting end 52 and a second connecting end 54. As illustrated in FIGS. 12 and 13, the vibration damper 42 (illustrated in broken lines) may be strategically located at, for example, an area adjacent the first connecting end 52. The presence of the vibration damper 42 aids in increasing damping without compromising the structural integrity of the control arm 50.

Figure 14:
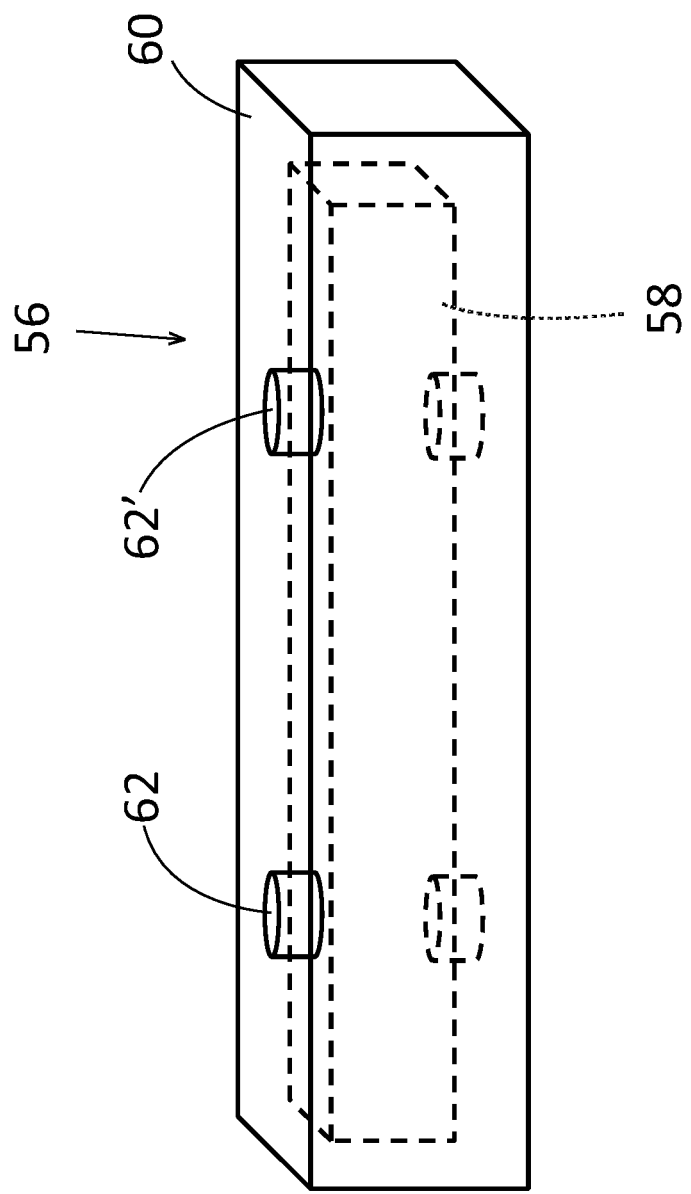
FIG. 14 is a perspective view of a vibration dampener according to yet a further embodiment of the disclosed inventive concept.

Referring to FIG. 14, an additional alternative cast-in two-piece vibration damper 56 is illustrated in perspective view. The vibration damper 56 includes a metal core 58 illustrated in broken lines in the figure. Surrounding the core 58 is a metal sheath 60. Openings 62 and 62' are formed through the metal sheath 60. A greater or lesser number of openings 62 and 62' may be provided. The openings 62 and 62' also serve the same function as the openings 22, 22', 22" and 22'" shown, for example, in FIGS. 1 and 2 and openings 25, 25', 25" and 25'" shown in FIG. 3.

Figure 15:
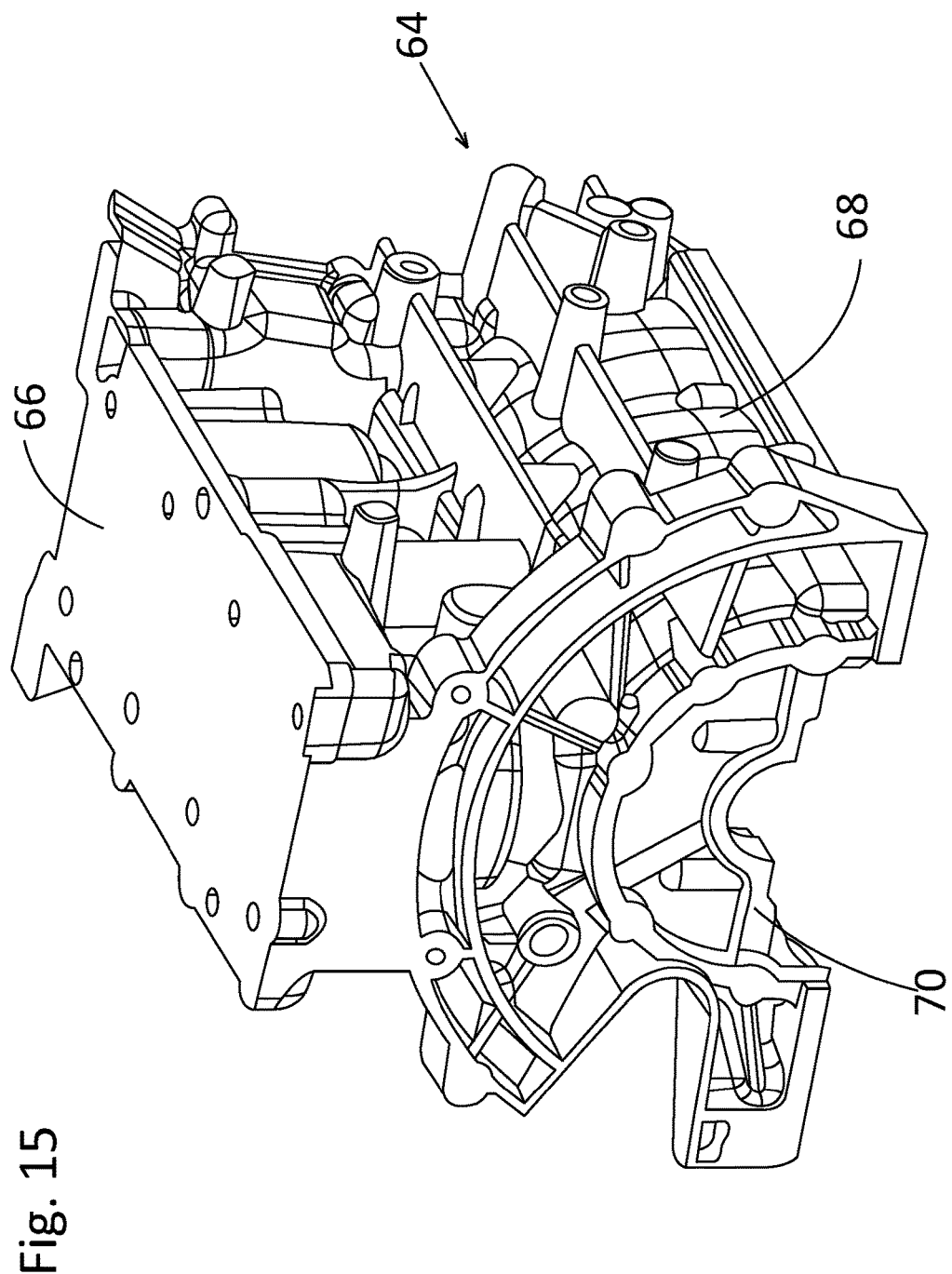
FIG. 15 is perspective view of an engine block in which the vibration dampener of FIG. 14 has been embedded.
Figure 16:
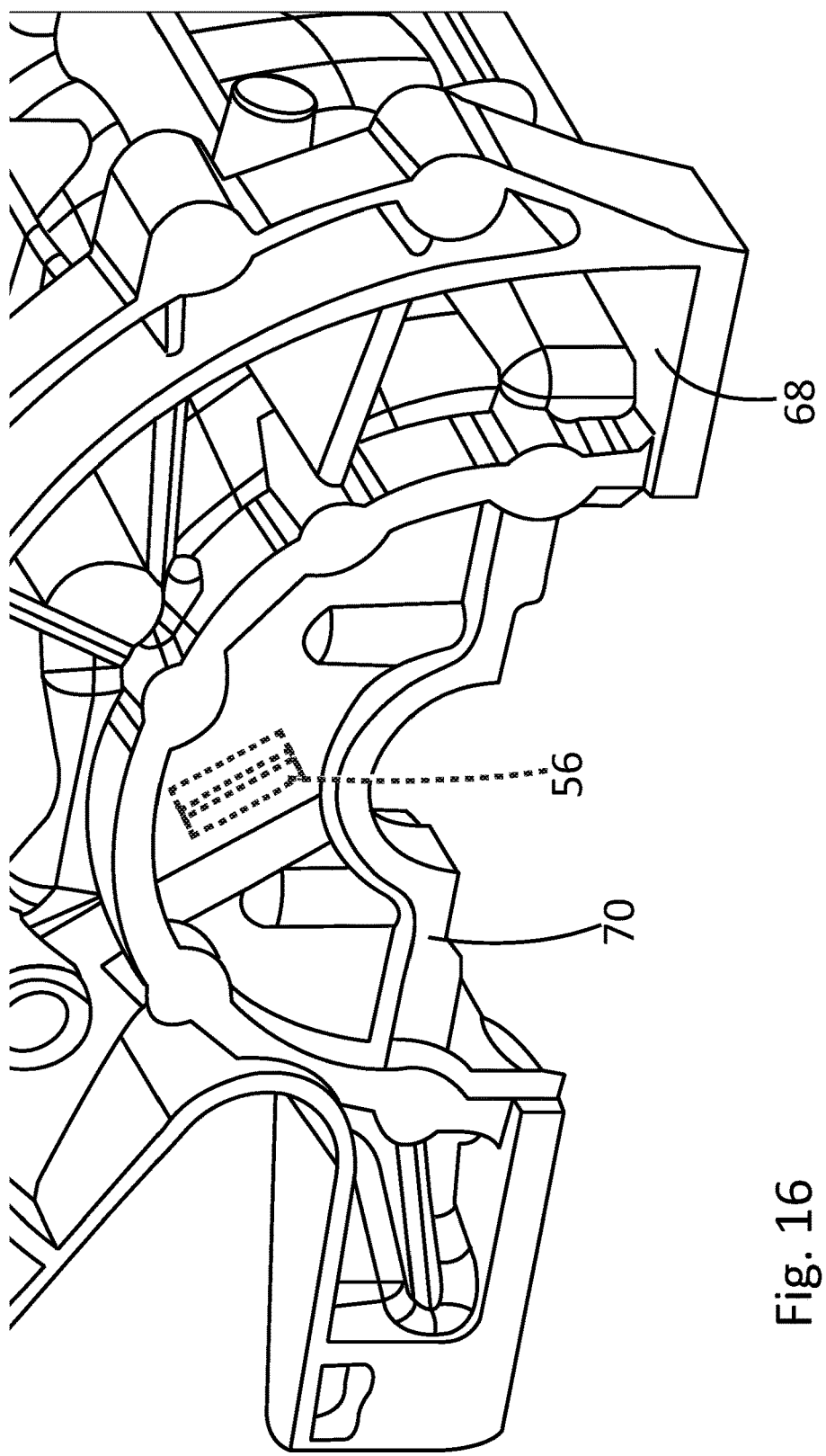
FIG. 16 is view of a portion of the engine block of FIG. 15 illustrating the vibration dampener of FIG. 14 embedded therein.

The vibration damper 56 may be adapted for use in any of a number of cast components such as an engine components. As a non-limiting example, and as illustrated in FIG. 15, the vibration damper 56 may be positioned within a component such as an engine block 64. The engine block 64 includes an upper portion 66, a lower portion 68 and a forward portion 70. As illustrated in FIG. 16, the vibration damper 56 may be strategically located at, for example, an area adjacent the forward portion 70 of the engine block 64. The presence of the vibration damper 56 also aids in increasing damping without compromising the structural integrity of the engine block 64.

One skilled in the art will readily recognize from such discussion, and from the accompanying drawings and claims that various changes, modifications and variations can be made therein without departing from the true spirit and fair scope of the invention as defined by the following claims.

What is claimed is:

1. A coulomb friction damped component for use in a vehicle comprising:
   a cast body;
   a coulomb friction damping insert embedded within said cast body, said insert including a ring-shaped core and a sheath encasing said core, said core having a planar surface, said sheath including openings, said openings exposing said planar surface of said core, said sheath being fixed relative to said cast body and being movable relative to said core whereby a dry sliding friction contact is created at the interface of said sheath and said core.

2. The coulomb friction damped component of claim 1 in which said core is formed of a solid metal.

3. The coulomb friction damped component of claim 1 in which said sheath is formed of metal.

4. The coulomb friction damped component of claim 1 wherein said sheath includes a first side and a second side opposite said first side, said openings being formed on both of said sides.

5. The coulomb friction damped component of claim 1 wherein said openings are coaxially aligned.

6. The coulomb friction damped component of claim 1 further including a molten-metal infused area formed around each of said openings.

7. The coulomb friction damped component of claim 1 wherein said cast body includes a hub portion and a disc portion and wherein said insert is integrally formed within said disc portion.

8. The coulomb friction damped component of claim 7 wherein said sheath includes openings and said component includes a central axis and said openings have an axisymmetric spatial distribution around said central axis.

9. The coulomb friction damped component of claim 8 wherein said insert includes multiple segments formed around said central axis.

10. A vibration-dampener for internal use in a disc-shaped cast metal component having a central axis, the vibration-dampener comprising:
    a solid coaxially-shaped core composed of a metal;
    a sheath encasing said core, said sheath being composed of a metal, said sheath including a first side, a second side, and openings being formed on both of said sides, said core forming a bottom surface of said openings, said sheath being fixed relative to cast metal component, said core being movable relative to said sheath, whereby a dry sliding friction contact is created at the interface of said sheath and said core.

11. The vibration-dampener of claim 10 wherein said openings are aligned with each other.

12. The vibration-dampener of claim 10 wherein the disc-shaped cast metal component includes a central axis and said openings have an axisymmetric spatial distribution around said central axis.

13. The vibration-dampener of claim 10 further including a molten-metal infused area formed around each of said openings.

14. A method for forming a coulomb friction damped rotor for use in a vehicle braking system, the method comprising:
    forming a rotor mold;
    forming a solid, ring-shaped core having a planar surface;
    forming a sheath around said ring-shaped core, said sheath including openings;
    positioning said sheath-encased core within said rotor mold; and
    introducing molten metal into said mold to surround said sheath-encased core,
    wherein said openings expose said planar surface of said core.

15. The method for forming a coulomb friction damped rotor of claim 14 further including a molten-metal infused area formed around each of said openings.

* * * * *